United States Patent
Doyle et al.

(10) Patent No.: US 7,099,295 B1
(45) Date of Patent: Aug. 29, 2006

(54) APPARATUS AND METHOD FOR BRIDGING A WIRED NETWORK AND WIRELESS DEVICES

(75) Inventors: Michael Anthony Doyle, Mississauga (CA); Joseph Harold Buccino, Oakville (CA); Robert Philip Vandervecht, Acton (CA)

(73) Assignee: Psion Teklogix, Inc., Mississauga (CA)

( * ) Notice: Subject to any disclaimer, the term of this patent is extended or adjusted under 35 U.S.C. 154(b) by 0 days.

(21) Appl. No.: 09/384,108

(22) Filed: Aug. 27, 1999

(51) Int. Cl.
*H04Q 7/24* (2006.01)
(52) U.S. Cl. ...................... 370/338; 370/401
(58) Field of Classification Search ............. 370/285, 370/310, 315, 316, 335, 332, 338, 391, 401, 370/400, 465, 466, 469, 470, 501, 503
See application file for complete search history.

(56) References Cited

U.S. PATENT DOCUMENTS

| | | | | |
|---|---|---|---|---|
| 5,546,397 A | * | 8/1996 | Mahany | 370/85.1 |
| 5,570,366 A | * | 10/1996 | Baker | 370/85.13 |
| 5,901,362 A | * | 5/1999 | Cheung | 455/525 |
| 5,912,921 A | * | 6/1999 | Warren | 375/220 |
| 5,987,011 A | * | 11/1999 | Toh | 370/331 |
| 6,005,870 A | * | 12/1999 | Leung | 370/466 |
| 6,046,992 A | * | 4/2000 | Meier | 370/338 |
| 6,272,120 B1 | * | 8/2001 | Alexander | 370/338 |
| 6,272,337 B1 | * | 8/2001 | Mount | 455/423 |
| 6,405,259 B1 | * | 6/2002 | Cheston et al. | 709/245 |

* cited by examiner

*Primary Examiner*—Chirag Shah (57) ABSTRACT

A bridge apparatus is provided for interfacing or bridging between a wired network having wired communication devices and wireless devices. The bridge apparatus of the present invention is typically used in a warehouse inventory control system. In one embodiment, the bridge apparatus includes two more radios having different modalities in order to provide different modality and/or types of coverage to different wireless devices. In another embodiment, a single bridge apparatus offers different coverage areas. The bridge apparatus has a filter device for filtering data received from the wired network, and forwards the filtered data to a wireless device. Thus, data can be forwarded to the wireless devices from the wired network without a need for protocol conversion. In another embodiment, a bridge apparatus functions both as an access point to filter data received from the wired network, and as a base station to convert protocol information included in data received from the wired network.

7 Claims, 8 Drawing Sheets

APPARATUS AND METHOD FOR BRIDGING A WIRED NETWORK AND WIRELESS DEVICES

FIELD OF THE INVENTION

This invention relates to an apparatus and method for bridging a wired network and wireless devices, and more particularly, to a bridge apparatus and method for bridging a wired network to a plurality of wireless devices of different types and modalities.

BACKGROUND OF THE INVENTION

In warehouse inventory control, it is known to use handheld wireless units communicating with a central computer through one or more base stations. The central computer is typically provided in a wired Local Area Network (LAN). The base stations handle data traffic between the central computer and the handheld wireless units. Each base station is provided with a radio through which data received from the central computer is transmitted to the handheld wireless units, and vice versa.

The wired LAN uses a wired network protocol, such as Transmission Control Protocol/Internet Protocol (TCP/IP) for communications between wired communication devices. Wireless networks have much lower capacity and higher error-rate compared to wired networks. The common wired protocols are very inefficient and often not suitable for wireless networks. Thus, the wireless devices use a wireless network protocol which is designed for use over a wireless network.

A typical base station monitors messages on the wired network. When the base station recognizes that a message on the wired network is intended for one of the wireless handheld units, it strips all of the wired network protocol information from the message and replaces it with wireless network protocol information. For this reason, a base station is sometimes called a protocol converter.

There exist base stations for connecting a wired network and wireless devices, such as those connecting cellular phones and public telephone systems. However, these base stations are very complicate and costly to manufacture. Accordingly, they are generally not suitable for warehouse inventory control.

In order to connect two networks, it is known to use bridges and routers. A bridge connects two networks which use the same protocols. The bridge reads data received in its input. It creates a table of end-stations indicating the direction of the connection of the end stations. The bridge forwards the data as appropriate. However, it does not deal with connections between two networks which use different protocols. Further, existing bridges are designed for connecting two wired networks. A router can act as a protocol convertor. It alters packets to connect two networks which use different protocols. However, existing routers are generally designed for connecting two wired networks.

U.S. Pat. No. 5,546,397 issued to Mahany on Aug. 13, 1996 discloses an access point which is a base station provided on a wireless local area network with which roaming portable or mobile computer devices can connect and communicate. Each access point uses two wireless adapters and a low level protocol processor. The second adapter is essentially a backup in the event that the first adapter fails, thus improving the reliability of the access point and the entire network. Otherwise, the access point of Mahany functions in the same way as a typical base station described above, and does not provide any other additional functionality.

Therefore, it is desirable to provide an apparatus which can bridge a wired network and a plurality of wireless devices of different types or modalities, without performing protocol conversion, and which is simple and suitable for warehouse inventory control.

SUMMARY OF THE INVENTION

It is therefore an object of the invention to provide a novel bridge apparatus and method which obviates or mitigates at least one of the disadvantages of the prior art.

A bridge apparatus is provided for interfacing or bridging between a wired network having wired communication devices and wireless devices. In one embodiment, the bridge apparatus includes two more radios having different modalities in order to provide different modality and/or types of coverage to different wireless devices. In another embodiment, a single bridge apparatus offers different coverage areas. The bridge apparatus can include a filter device for filtering data received from the wired network, and forwards the filtered data to a wireless device. Thus, data can be forwarded to the wireless devices from the wired network without a need for protocol conversion. In another embodiment, a bridge apparatus functions both as an access point to filter data received from the wired network, and as a base station to convert protocol information included in data received from the wired network.

In one aspect of the invention, there is provided a bridge apparatus for bridging between a wired network having wired communication devices, and wireless devices including first type wireless devices and second type wireless devices, the bridge apparatus comprising: a wired network interface for interfacing data communication between the bridge apparatus and the wired communication devices of the wired network; a first type radio for interfacing data communication between the bridge apparatus and the first type wireless devices; a second type radio for interfacing data communication between the bridge apparatus and the second type wireless devices; and a bridge controller for controlling data traffic between the wired network and the first and second type wireless devices, the bridge controller functioning in a first mode using the first type radio when data is transmitted from or destined for the first type wireless devices, and functioning in a second mode using the second type radio when data is transmitted from or destined for the second type wireless devices.

In accordance with another aspect of the present invention, there is provided a bridge apparatus for bridging between wireless communication devices and a wired network having wired communication devices, the bridge apparatus comprising a wired network interface for interfacing data communication between the bridge apparatus and the wired network having a first capacity for data communication; a radio for interfacing data communication between the bridge apparatus and the wireless communication devices, the wireless communication devices having a second capacity for data communication; and a bridge controller for controlling data traffic between the wired network and the wireless communication devices, the bridge controller having a filter device for filtering data received from the wired network and forwarding filtered data to the wireless communication devices.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description of certain exemplary embodiments and the drawings in which.

DETAILED DESCRIPTION OF THE PREFERRED EMBODIMENTS

Figure 1:
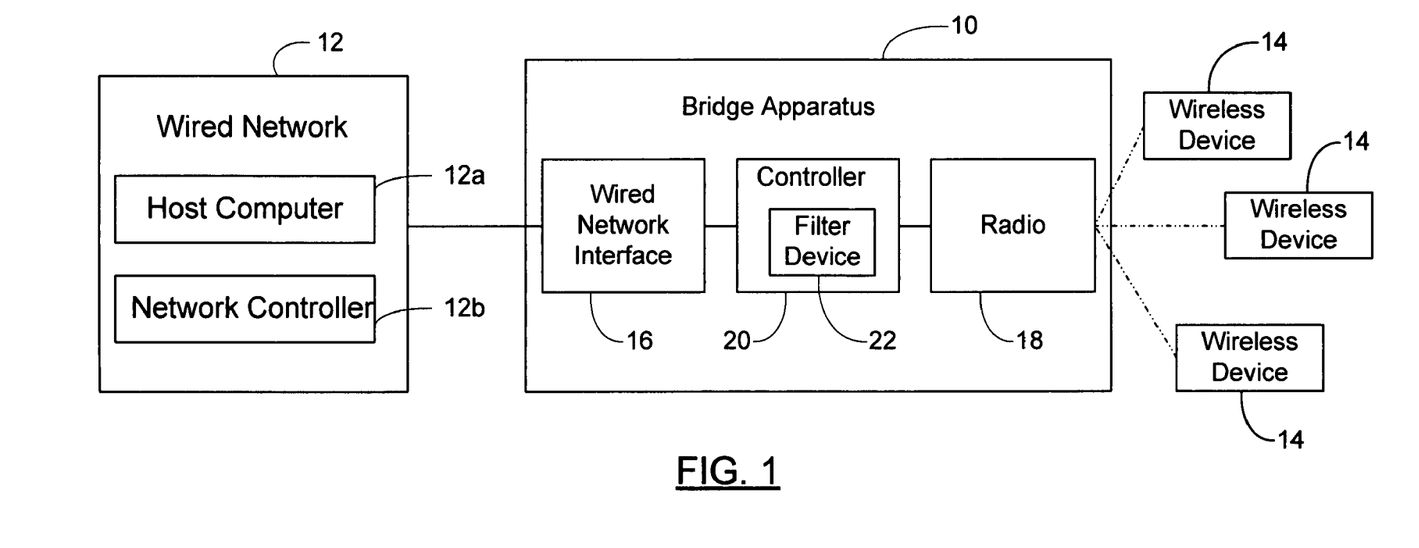
FIG. 1 is a block diagram showing an embodiment of a bridge apparatus in accordance with the present invention.

Referring to FIG. 1, an embodiment of a bridge apparatus 10 according to the present invention is described. The bridge apparatus 10 is provided between a wired network 12 and wireless devices 14. The wireless devices 14 can be mobile devices, such as handheld units or vehicle mount devices, providing remote and/or mobile computing functions. The wireless devices 14 can be wireless access points connecting between wireless networks.

The bridge apparatus 10 transparently bridges between the wired network 12 and the wireless devices 14. That is, the bridge apparatus 10 operates as an access point. The bridge apparatus 10 monitors the wired network 12 for messages or data intended for any wireless device 14 for which the bridge apparatus 10 is servicing, and forwards the data to the wireless device 14. The bridge apparatus 10 also receives data from a wireless device 14 and forwards the data to the wired network 12. In this way, a population of wireless devices 14 appear to have a standard connection to the wired network 12 and can interact with other services and devices on the wired network 12 without any need for special handling.

The bridge apparatus 10 comprises a wired network interface 16, a radio 18 and a bridge controller 20.

The wired network interface 16 interfaces data communication between the bridge apparatus 10 and wired devices of the wired network 12. The wired network interface 16 is selected depending on the type of the wired network 12. It can be an Ethernet interface, a Token Ring interface or other type of interface.

The radio 18 interfaces data communication between the bridge apparatus 10 and wireless devices 14.

The bridge controller 20 controls data traffic between the wired network 12 and the wireless devices 14. The wireless devices 14 has capacity which is generally lower than that of the wired network 12. The bridge controller 20 is provided with a filter device 22. By using the filter device 22, the bridge controller 14 controls the data traffic so that it does not transfer all data received from the wired network 12 to the wireless devices 14.

Figure 7:
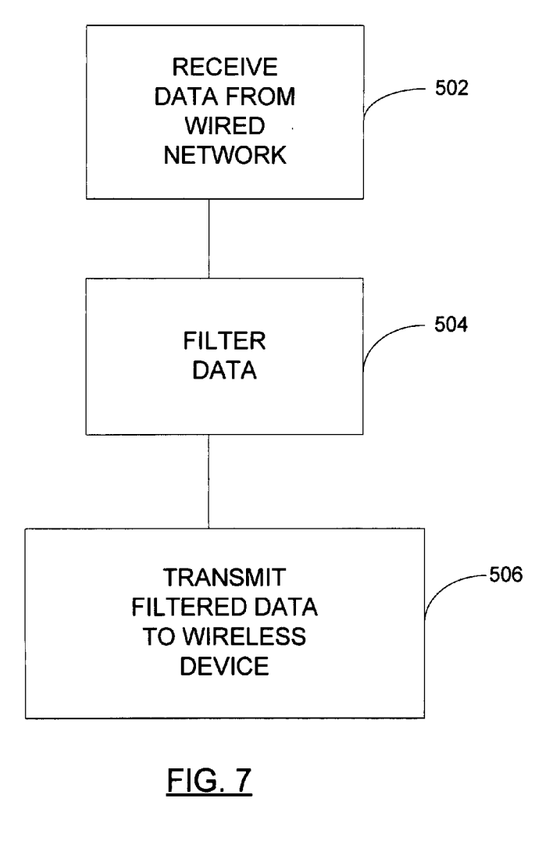
FIG. 7 is a flowchart showing an embodiment of a method for bridging data from a wired network to a wireless device in accordance with the present invention.

As shown in FIG. 7, the bridge apparatus 10 receives data from the wired network 12 (S02). The filter device 22 filters the data (S04), and forwards the filtered data to the radio 18 for transmission to the wireless devices 14 (S06). The filter device 22 simply forwards the data to the wireless devices 14 or disregards the data. It does not do any protocol conversion.

Filtering of data by the filter device 22 can be carried out based on any characteristics of data which correspond to characteristics of one or more wireless devices 14.

For example, each of the wireless devices 14 can be assigned with a unique address. When a wired communication device sends data to a wireless device 14, it includes in the data the address of the wireless device 14. Using the address included in data, the filter device 22 filters the received data.

The filter device 22 can filter the received data in different ways. It can have a list of addresses of wireless devices 14 for whom the bridge apparatus 10 does not transmit data, and filter the data including an address which is listed in the list. Also, the filter device 22 can have a list of multicast addresses for whom the bridge apparatus 10 does not transmit data, and filter the data including the multicast addresses which are listed in the list.

Similarly, the filter device 22 can use lists of addresses of wireless devices 14 for whom the bridge apparatus 10 transmits data.

Data sent by a wired device includes protocol information which indicates the wired network protocol that the wired device uses to send the data. The filter device 22 can filter data based on such protocol information included in the data. By selecting specific protocols, the filter device 22 directs the bridge apparatus 10 to forward or discard data that contain a selected protocol. Thus, the bridge apparatus 10 can be selective of what type of data will be bridged over the radio, and can limit the amount of data on the wireless network.

When the wired network 12 is an Ethernet network, data being sent is divided into frames. Each frame encapsulates fields indicating a wired network protocol type which is used for sending the frame. The filter device 22 can forward or discard the data by filtering the protocol type fields in the frame.

The filter device 2 can strip out, for example, detailed graphics in a hyper-text mark-up language web page, before the web page is transmitted. In this example, the filter device 22 simply watches for graphic files associated with the web page, removes the graphic file and the removes the reference to the graphic file from the web page.

Figure 2:
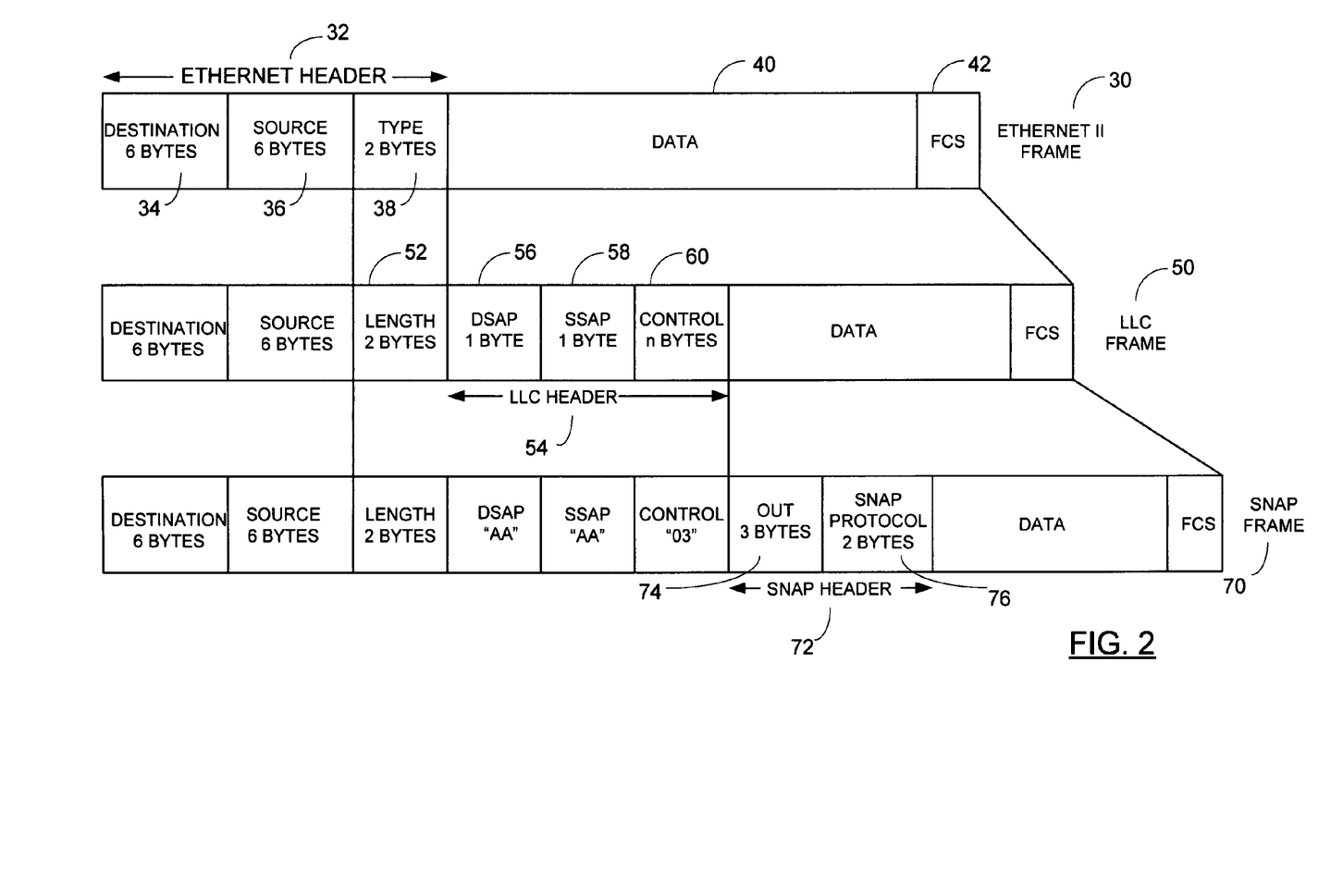
FIG. 2 is a block diagram showing data frame formats.

FIG. 2 shows fields of three different Ethernet frame formats: Ethernet II frame 30, Logical Link Control (LLC) frame 50 and Simple Network Management Protocol (SNAP) frame 70.

The Ethernet II frame 30 is a basic Ethernet frame which complies with the IEEE 802.3 standard. It comprises an Ethernet header 32, data field 40 and Frame Check Sequence (FCS) field 42. The Ethernet header 32 consists of a six-byte destination Media Access Control (MAC) address field 34, followed by a six-byte source MAC address field 34, and a two-byte protocol type field 38. If the protocol type field 38 contains a value that is greater than or equal to "0x0600", it is assumed to be the protocol identifier for an Ethernet II header.

The protocol type field 38 is used to determine which protocol is being used in the frame. The filter device 22 can use the type filed 38 to filter the received data by selecting the number which represents the Ethernet II protocol type to be filtered.

For example, if the bridge apparatus 10 is to forward only TCP/IP type data to the wireless devices 14, the filter device 22 can create two protocol filters, one to forward IP (type 0x0800) and the other to forward Address Resolution Protocol (ARP) (type 0x0806). The filter device 22 disregards data using other protocol types.

Referring back to FIG. 2, when the protocol type field contains a value that is less than "0x05DC", then the value is interpreted as a length field 52 instead, as shown in the LLC frame 50. It is assumed that an IEEE802.2 LLC header 54 is to follow the length field 52. The LLC header 54 consists of a Destination Service Access Point (DSAP) field 56, Source Service Access Point (SSAP) field 58 and control field 60.

The filter device 22 can filter the received data based on the values of the DSAP field 56 and/or the SSAP field 58.

If the DSAP and SSAP are both "0xAA", and the control field 60 has a value of "0x03", the LLC header will be followed by an extension which is a SNAP header 72, as shown in Standard Network Access Protocol (SNAP) frame 70. The SNAP header 72 includes an Organization Unit Identifier (OUI) field 74 and a SNAP type field 76.

The filter device 22 can filter selected values of OUI field 74 and/or SNAP type filed 76.

The filter device 22 can be also used to prevent broadcast/multicast storms from spreading throughout the network. Network storms can burden radio traffic with unnecessary data transmissions.

Storm filtering can be done by setting the maximum number of broadcast/multicast frames that should be received in a predetermined period. Every broadcast/multicast frame received will be discarded until it is determined that the storm is over. The broadcast storm is determined to be over when the number of broadcast frames received for the predetermined period is less than or equal to the value entered in the maximum number.

Figure 3:
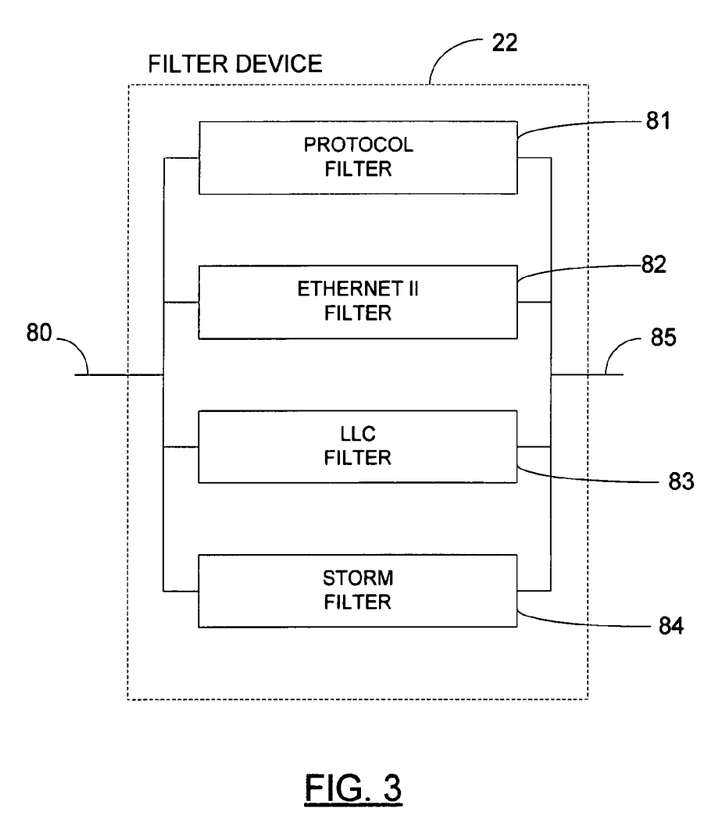
FIG. 3 is a block diagram showing an embodiment of a filter device shown in FIG. 1.

FIG. 3 shows an example of the filter device 22. The filter device 22 comprises protocol filter 81, Ethernet II filter 82, LLC filter 83 and storm filter 84. The protocol filter 81 filters based on protocol types. The Ethernet II filter 82 filters using the Ethernet protocol type filed 38. The LLC filter 83 filters using DSAP/SSAP fields 56, 58. The storm filter 84 uses the maximum number of broadcast/multicast frames. The data 80 is filtered by any of filters 81–84 and the filtered data 85 is output.

While this example contains four filters 81–84, the filter device 22 does not need to contain all of four filters 81–84. Some of filters 81–84 can be disconnected. Also, each filter 81–84 can consist of multiple filters of different criteria. The filter device 22 can also contain other type of filters.

By using the filter device 22, the present invention allows connection between the wired network 12 and the wireless devices 14 by a bridge apparatus 10 with a simple structure suitable for, e.g., warehouse inventory.

Also, by filtering data received from the wired network 12, the bridge apparatus 10 can transparently bridge data communication between the wired network 12 and wireless devices 14 regardless the differences in the capacity of the wired and wireless networks. This allows use of high performance wireless devices 14.

An example of such high performance wireless devices 14 is those complying with the IEEE 802.11 standard. The bridge apparatus 10 can be preferably applied to a wireless network which uses the IEEE 802.11 standard protocol.

The IEEE 802.11 standard protocol is an Open Systems Interconnection (OSI) standard for Wireless Local Area Networks (WLANs). It specifies a radio and wireless protocol intended to allow wireless devices from different manufactures to be used in the same system. With this standard, any IEEE 802.11 radio can communicate with any other similarly-equipped device. Previously each manufacturer selected a radio and had to create a proprietary protocol that prevented any chance of interoperability.

IEEE 802.11 solely standardizes two communications layers: Physical (PHY) and Medium Access Control (MAC). These different PHY layer media are covered by 2.4 GHZ Direct Sequence Spread Spectrum (DSSS) radio, 2.4 GHz Frequency Hopping Spread Spectrum (FHSS) radio, and infrared. Each station in a WLAN system has its own unique MAC address.

The bridge apparatus 10 can operate as an access point device between an IEEE 802.11 wireless network and a non-IEEE 802.11 wired network 12. Using the IEEE 802.11 protocol with the bridge controller 20, the bridge apparatus 10 provides a transparent interface or bridge between IEEE 802.11 wireless devices 14, and non-IEEE 802.11 wired devices, such as a host computer 12*a* or a network controller 12*b* that resides in the non-IEEE 802.11 wired network 12.

In a present embodiment, the radio 18 is based on the IEEE 802.11 standard in a Personal Computer Memory Card International Association (PCMCIA) format. The radio module includes a radio transmitter, an antenna and a radio interface for electrical connection.

The high data rates available with IEEE 802.11 standard can often mask the inefficiency of using protocols designed for wired networks over the wireless network.

Thus, the bridge apparatus 10 enables communication between any wireless IEEE 802.11-equipped devices and wired LAN devices operating on Ethernet, using a bridging protocol. The bridge apparatus 10 itself is resident on the LAN and functions as a MAC bridge, providing transparent integration between the stations on the wireless and wired networks. An IEEE 802.11 system can operate on one or more channels, with terminals moving between multiple bridge apparatuses.

Figure 4:
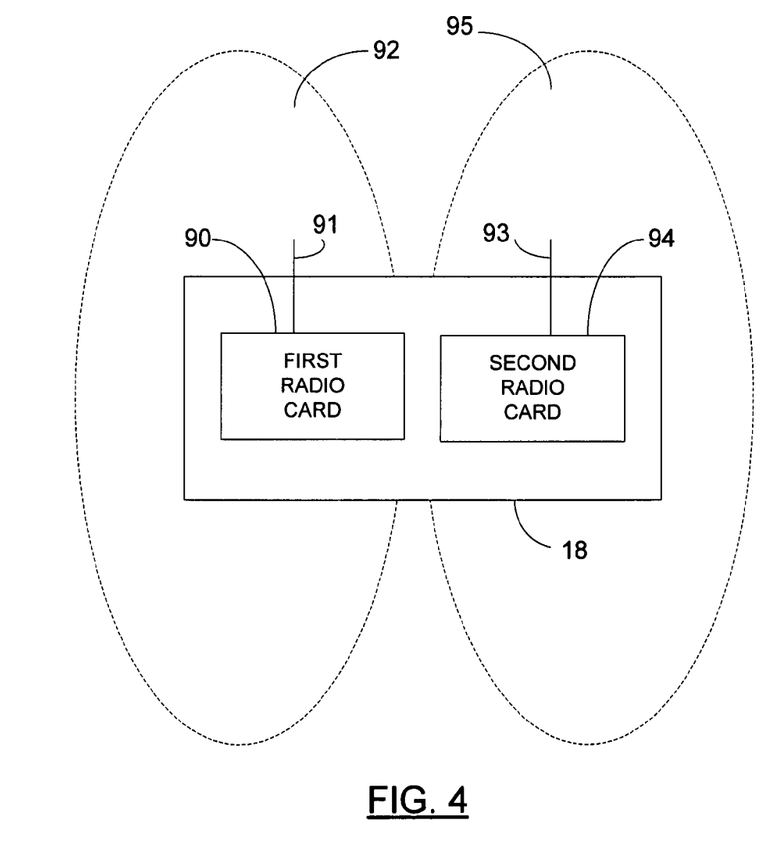
FIG. 4 is a block diagram showing an embodiment of a radio shown in FIG. 1.

The radio 18 can comprise multiple radio modules, such as radio cards, of same or similar characteristics. FIG. 4 shows first radio card 90 and second radio card 93. The first and second radio cards 90 and 93 are of similar technology. Each radio card 90, 93 has an antenna 91, 94. The antennae 91 and 94 have distinct coverage areas 92, 95. By using two radio cards, the coverage range of a single bridge apparatus 10 can be extended at reduced installation costs per coverage area.

There is no existing one ideal radio technology for all applications. For instance high frequency radios have excellent throughput capacity but low coverage characteristics. Low frequency radios have excellent coverage characteristics but low throughput capacity. It is common to abandon the lower frequency radios to achieve the higher data throughput. However, it is desirable that users can select the radio technologies that best meets requirements of their application.

In order to allow such selections, it is preferable that a bridge apparatus functions both as an access point and as a base station.

Figure 5:
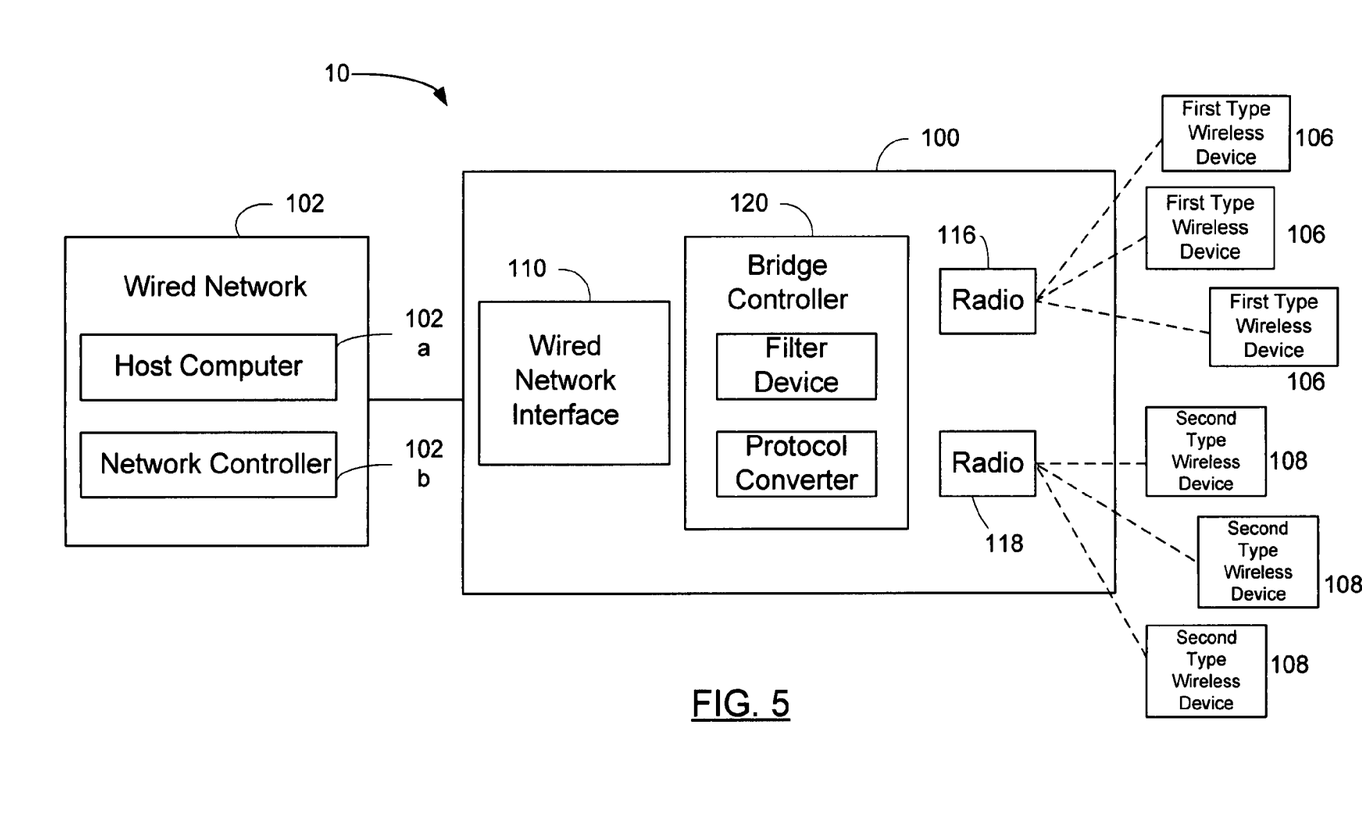
FIG. 5 is a block diagram showing another embodiment of a bridge apparatus in accordance with the present invention.

FIG. 5 shows an embodiment of such a bridge apparatus 100. The bridge apparatus 100 is provided between a wired network 102 and wireless devices 104.

The wired network 102 can include a host computer 102a and a network controller 104b.

The wireless devices 104 include first type wireless devices 106 and second type wireless devices 108. In a present embodiment, the first type wireless devices 106 use 2.4 GHz Spread Spectrum with the IEEE 802.11 standard protocol, and the second type wireless devices 108 use a narrow band, 902 Spread Spectrum, 2.4 GHz Spread Spectrum using a non-IEEE 802.11 wireless protocol. The second type wireless devices 108 can include wireless base stations connecting between wireless networks. It will be apparent that in other embodiments, different combinations of first type wireless devices 106 and second type wireless devices can be used, as desired.

In the present embodiment, the first type radio 106 and second type radio 108 are used independently.

Each of the first type devices 106 is preferably assigned with a unique address. The second type devices 108 can or can not have addresses as typical in handheld units conventionally used in warehouse inventory.

The bridge apparatus 100 comprises a wired network interface 110, a first type radio 116, a second type radio 118 and a bridge controller 120.

The wired network interface 110 is similar to the wired network interface 16 shown in FIG. 1. For example, it can be an Ethernet interface hardware provided on a main logic board of the bridge apparatus 100 or a Token Ring interface on a PCMCIA card.

The first type radio 116 interfaces data communication between the bridge apparatus 100 and the first type wireless devices 106. The second type radio 118 interfaces data communication between the bridge apparatus 100 and the second type wireless devices 108.

The bridge controller 120 controls data traffic between the wired network 102 and the wireless devices 104. It has a bridge filter 122 and a protocol convertor 124.

Figure 8:
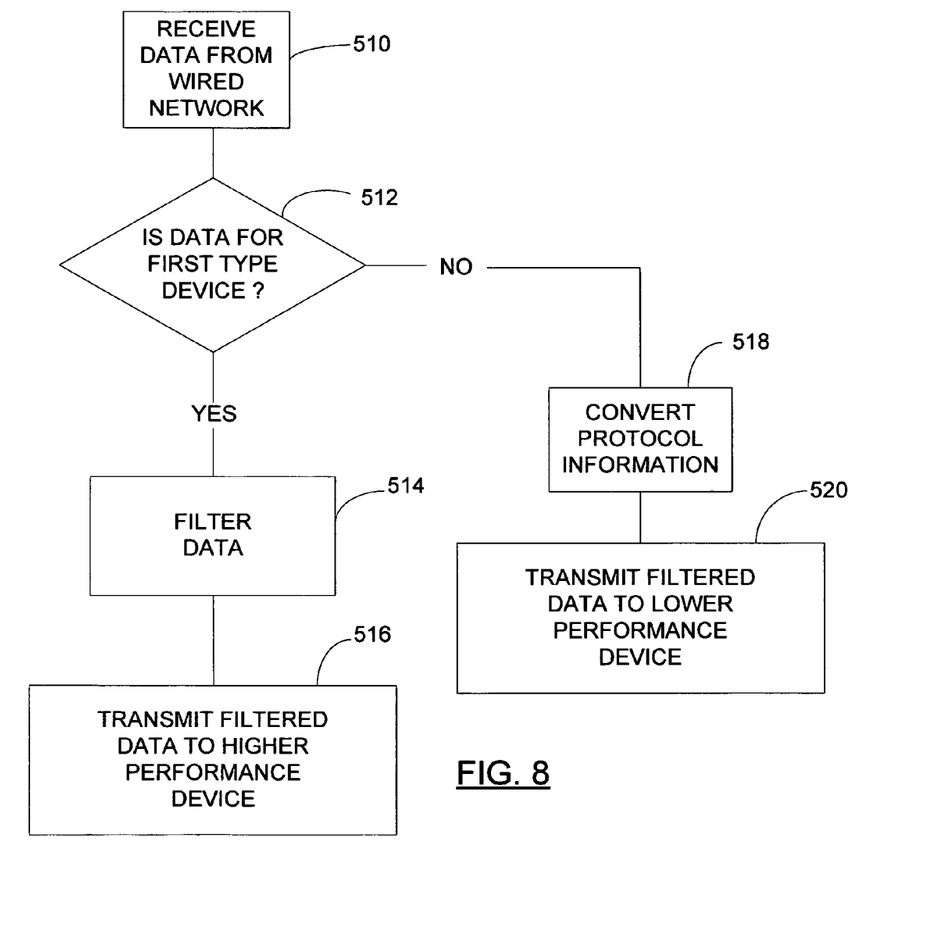
FIG. 8 is a flowchart showing another embodiment of a method for bridging data from a wired network to a wireless device in accordance with the present invention.

The bridge controller 120 functions in a first mode when data is transmitted from or destined for the first type wireless devices 106. In this mode, the bridge apparatus 100 acts as an access point in a similar manner to the bridge apparatus 10 shown in FIG. 1. As shown in FIG. 8, when the data is received from the wired network 102 (S10), the bridge controller 120 checks if it is for a first type device 106 (S12). If so, the bridge controller 120 filters data using the filter device 122 which is similar to the filter device 22 of the bridge apparatus 10 (S14). The filtered data is transmitted to the first type wireless device 106 (S16).

The bridge controller 120 also functions in a second mode when data is transmitted from or destined for the second type wireless devices 108. In this mode, the bridge apparatus 100 acts as a base station. As shown in FIG. 8, when the data received from the wired network 102 is for a second type device 108 (S12), the bridge controller 120 uses the protocol convertor 124 to convert between a wired protocol used by the wired devices and a wireless protocol used by the second type wireless devices 108 (S18). The wireless protocol is designed to allow all wireless devices 108 to communicate with the bridge apparatus 100 functioning as a base station by sharing the use of a radio channel in an efficient way. The protocol convertor 124 replaces the wired protocol information with the wireless protocol information when data is to be sent to the wireless devices 108. The protocol converted data is then transmitted to the second type wireless device 108 (S20).

Thus, when the bridge apparatus 100 functions as an access point, it can use a first type wireless protocol, such as the IEEE 802.11 protocol. When it functions as a base station, it can use a second type wireless protocol, such as a protocol used on Spread Spectrum radio systems.

The bridge controller 120 is preferably capable of operating in both first and second modes simultaneously.

As electrical interfaces to the first and second type radios 116, 118, it is preferable that the bridge apparatus 100 uses a PCMCIA connector. PCMCIA connectors allow easy interchanging of radio technologies and provide an upgrade path as new radio technologies. The PCMCIA connector has two PCMCIA electrical interfaces for two PCMCIA-based radio modules; one for the first type radio 116 and the other for the second type radio 118. The PCMCIA connector allows multiple radio interfaces for communication between the bridge apparatus 100 and the first and second type wireless devices 106, 108.

When the bridge apparatus 100 acts as a base station, it uses routing information for forwarding received data. The bridge apparatus 100 can send out polls to obtain routing information. Then, it can regularly broadcast routing information indicating the available routes back to the network controller 102b. Wired devices of the wired network 102, wireless devices 108 and wireless base stations receive the broadcasts, and determine the best communication route to send their messages. If a better route becomes available, the respective wired devices, wireless devices and base stations change communication paths accordingly.

It is preferable that the second type wireless protocol allows one or more base stations to be added to the entire system without cable connections. The system can operate on one channel or on multiple channels.

As described above, each of the first type wireless communication devices 106 is assigned with an address. Data transmitted from and destined for one of the first type wireless communication devices 106 includes such an address. The bridge controller 112 can perform in the first and second modes in accordance with the address included in the data.

As previously discussed, different types of radios or wireless devices offer different ranges of coverages and bit-rates, and accordingly, for this and other reasons it can be desired to provide a plurality of coverage areas within a larger area, in order to provide seamless coverage to radios or wireless devices moving between the coverage areas.

In the present embodiment of the invention, coverage areas can be integrated by providing multiple bridge apparatuses (i.e. combinations of bridge apparatus 10 and/or bridge apparatus 100, as desired) in a network system. Each bridge apparatus offers its own radio coverage. The bridge apparatuses are preferably distributed to cover a predetermined area with their radio coverages. This allows wireless devices to move seamlessly between the bridge apparatuses 10, 100 in the system.

It is presently preferred that the mobile wireless device manages the transfer of communication between adjacent bridges. For example, when a mobile wireless device moves from a first radio coverage of a first bridge apparatus to a second radio coverage of a second bridge apparatus, the mobile wireless device initiates communicates with the second bridge, and upon establishing a successful communication interface therewith, terminates communications with the first bridge apparatus, thus effecting a seamless transfer of communication between the first and second bridges. It will occur to those of skill in the art that other means of effecting transfer from the first bridge to the second bridge can be implemented in other embodiments of the invention, as desired.

Figure 6:
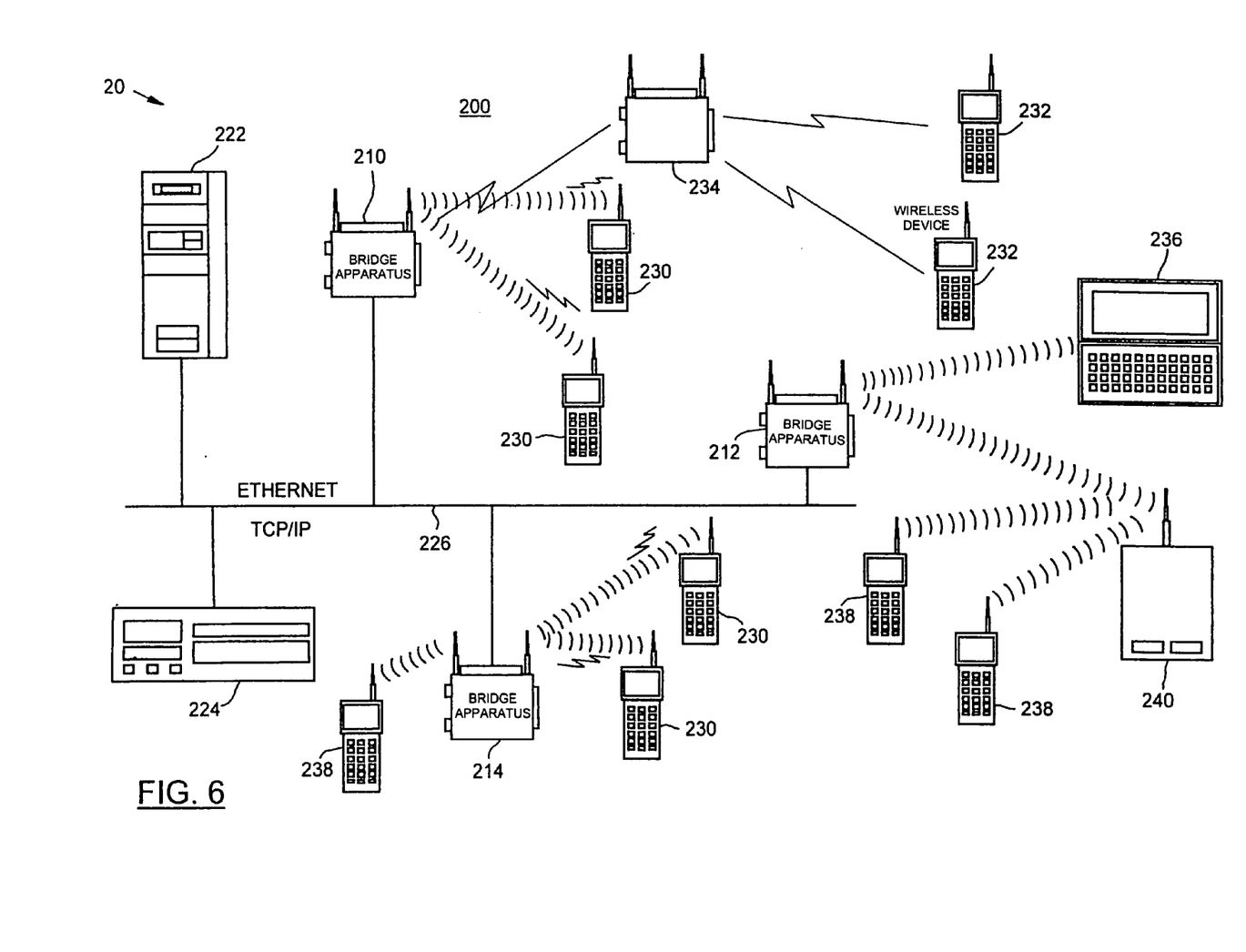
FIG. 6 is a diagram showing an example of use of bridge apparatuses shown in FIG. 5.

FIG. 6 shows an example of use of multiple bridge apparatuses in accordance of the invention in a network system 200. The network system 200 uses three bridge apparatuses 210, 212, 214 to bridge between a wired local area network 220 and wireless devices 230–240.

The wired network 220 includes a host computer 222 and a network controller 224. The wired network 220 uses Transmission Control Protocol/Internet Protocol (TCP/IP) on Ethernet medium 226.

The wireless devices 230, 232 are handheld RF terminals and the device 234 is a wireless access point. The handheld RF terminals 232 communicate with the wireless access point 234. The wireless devices 230, 232, 234 comply with the IEEE 802.11 Wireless LAN Standard, and as such are each first type wireless devices. The devices 230, 232, 234 can use either FHSS 2.4 GHz or DSSS 2.4 GHZ.

The wireless device 236 is a vehicle-mount RF terminal, the devices 238 are handheld RF terminals and the device 240 is a wireless base station. The wireless devices 234, 236 and 238 are second type devices, and use the 902 MHz DS spread spectrum. The RF terminals 236 communicate with the base station 238.

The bridge apparatus 210 is currently functioning as an access point to communicate with the RF terminals 230, 232 and access point 234. The bridge apparatus 210 is connected to the Ethernet link 226 of the wired network 220 through an Ethernet interface.

As an access point, the bridge apparatus 210 forms a communication link between the local area network 220, and the RF terminals 230 and access point 234 which form a further communication link with the RF terminals 232. The bridge apparatus 210 communicates over an IEEE 802.11 RF data link with the RF terminals 230 and the access points 234, and over a cable with the host computer 222 and the network controller 224 residing on the wired network 220.

The bridge apparatus 212 is currently functioning as a base station to communicate with the vehicle-mount RF terminal 236 and wireless base station 240 which in turn communicates with the low performance handheld terminals 238.

As a base station, the bridge apparatus 212 provides a communication link between the local area network 200, and the RF terminals 236, 238 and the wireless base station 240 and their terminals 238. The bridge apparatus 212 uses a protocol for low performance wireless communication with the RF terminals 236, 238 and the base station 240.

The bridge apparatus 214 is currently functioning as both an access point and a base station to communicate with handheld RF terminals 230 and a handheld terminal 238. Each bridge apparatus 210, 212, 214 has a memory which stores boot code, configuration parameters and firmware. The configuration parameters can be changed, added or deleted. They can be reconfigured remotely via the wired network 220 using, for example, a standard hyper-text mark-up language (HTML) web browser.

When a RF terminal 238 moves from the radio coverage of the bridge apparatus 212 to the radio coverage of the bridge apparatus 214, the bridge apparatus 212 hands over the data communication with the handheld terminal 238 to the bridge apparatus 214. The terminal 238 communicates with bridge apparatuses and base stations which are within the radio range of the terminal 238. It determines which bridge apparatus or base station provides the best communication path to a bridge apparatus which resides on the wired network 220, using routing information stored in each bridge apparatus or base station. If multiple channels are used, the terminal looks for a better channel only if it cannot find an acceptable path back on its current channel.

When a RF terminal 230 moves from the radio coverage of the bridge apparatus 210 to the radio coverage of the bridge apparatus 214, the terminal 230 manages the transfer of communication from bridge apparatus 210 to bridge apparatus 214.

For example, when the bridge apparatus 210 is connected to the wired Ethernet LAN 220, a wired device on the network 220 encapsulates the data in an Ethernet frame, including a destination MAC address specifying the mobile terminal 230, and sends the frame onto the LAN 220. The bridge apparatus 210, which has the mobile terminal 230 associated therewith, takes the frame and passes it over the RF link to the mobile terminal 230. Similarly, a frame from the mobile terminal 230 is sent to the bridge apparatus 210 associated with the mobile terminal 230. The mobile terminal 230 puts a destination MAC address in the frame that specifies a hardware address of a wired device on the LAN 220. On the LAN 220, the frame is picked up by a wired device at the destination hardware address. By passing frames in this way, the bridge apparatus is acting as a MAC bridge.

When the terminal 230 moves out of range of the bridge apparatus 210, it will associate with another bridge apparatus, e.g. 214, which will then receive the data frames of the terminal 230. One suitable means for selecting a bridge apparatus to be associated with terminal 230 is discussed in the 802.11 Specification. The bridge apparatus 214 passes the data onto the Ethernet LAN 220 in Ethernet frames. Returning frames are no longer accepted by the first bridge apparatus 210, which has disassociated from the mobile terminal 230. Returning frames for the mobile terminal 230 are now accepted by the newly-associate bridge apparatus 214 and passed over the RF to the mobile terminal 230.

While particular embodiments of the present invention have been shown and described, changes and modifications can be made to such embodiments without departing from the scope of the invention. For example, only first and second type radios are used in the above embodiment, but more than two different types of radios can be used. Also, two radio cards per each radio is disclosed in the above embodiments, but more than two radio cards can be used. Furthermore, they do not have to take a form of radio cards. Any types of radios suitable for the purposes of the bridge apparatus can be used. The host computer can also function as a network controller. It will also be apparent that the present invention encompasses combinations of the above-described embodiments.

What is claimed is:

1. A communication device for facilitating communication between a wired network and wireless devices, the wireless devices including a first mobile wireless device and a second mobile wireless device, the first mobile wireless device being configured for communication using a first communication protocol, the second mobile wireless device being configured for communication using a second communication protocol different from the first communication protocol, the communication device comprising:
 a wired network interface providing for communication with the wired network;
 a first radio configured for communication with the first mobile wireless device via the first communication protocol;
 a second radio configured for communication with the second mobile wireless device via the second communication protocol; and a data controller in communication with the network interface and the first and second radios, the data controller for controlling data traffic between the wired network and the wireless devices, the data controller for:
  (i) receiving data from the wired network, the data being intended for reception by one mobile wireless device selected from the first and the second mobile wireless device, the data including wireless protocol information that indicates a wireless protocol used for communicating the data to the one mobile wireless device;
  (ii) selecting one radio from the first and second radio, the one radio being selected in accordance with the communication protocol associated with the data, the communication device having received an initiation of communications from the one mobile wireless device when the one mobile wireless device entered a coverage area of the one radio; and
  (iii) transmitting all the data directly to the one mobile wireless device via the selected radio.

2. The communication device according to claim 1, wherein
  the wireless devices are each assigned a respective address, and the received data includes the address of the respective mobile wireless device; and
  the data controller is configured to route the received data to the respective radio in accordance with the address included in the received data.

3. The communication device as claimed in claim 2, wherein the first radio has a first radio coverage area, and the second radio has a second radio coverage area, and a size of the second radio coverage area is different than a size of the first radio coverage area.

4. The communication device as claimed in claim 3, wherein one of the communications protocols is in accordance with the IEEE 802.11 specification.

5. A method for a communication device to facilitate communication between a wired network and wireless devices, the wireless devices including a first mobile wireless device and a second mobile wireless device, the first mobile wireless device being configured with a first communication protocol, the second mobile wireless device being configured with a second communication protocol different from the first communication protocol, the communication device including a first radio configured for communication via the first communication protocol, and a second radio configured for communication via the second communication protocol, the method comprising the steps of:
  receiving from the wired network the data intended for reception by one mobile wireless device selected from the first and second mobile wireless device, the data including wireless protocol information that indicates a wireless protocol used for communicating the data to the one mobile wireless device;
  selecting one radio from the first and second radio, the one radio being selected in accordance with the communication protocol associated with the data, the communication device having received an initiation of communications from the one mobile wireless device when the one mobile wireless device entered a coverage area of the one radio; and
  transmitting all the data directly to the one mobile wireless device via the one radio.

6. The method as claimed in claim 5 wherein:
  the wireless devices are assigned a respective address, and the received data includes the address of the respective mobile wireless device; and
  the step of controlling comprises routing the received data to the respective radio in accordance with the address included in the received data.

7. The method as claimed in claim 6 wherein the first radio has a first radio coverage area, and the second radio has a second radio coverage area, and a size of the second radio coverage area is different than a size of the first radio coverage area.

* * * * *